3,480,570
METHOD OF FOAMING POLYMERIC PARTICLES CONTAINING A FOAMING AGENT
Brinley Roberts, Goole, and Robert James Stephenson, Cwmbran, England, assignors to Monsanto Chemicals Limited, London, England, a British company
No Drawing. Filed Sept. 20, 1966, Ser. No. 580,603
Claims priority, application Great Britain, Sept. 21, 1965, 40,150/65
Int. Cl. C08f 47/10
U.S. Cl. 260—2.5                    10 Claims

ABSTRACT OF THE DISCLOSURE

Foamable resin particles for use in a process for preparing a foamed resin by (1) heating foamable particles comprising a vinylaromatic polymer and a volatile blowing agent to form a prefoam of foamed particles, (2) treating the prefoam with steam in a mold to form a shaped article, and (3) allowing the shaped article to cool before removing it from the mold. The particles comprise a lipophilic surface-active agent which serves to (a) reduce cluster formation during prefoaming, (b) increase the maximum flow angle of the prefoam, (c) reduce the cooling time required before the shaped article can safely be removed from the mold, and (d) improve the consolidation of the individual particles in the final molded article.

---

This invention relates to foamable resins, and particularly to foamable vinylaromatic polymers and to foamed products prepared from them.

A foamed vinylaromatic polymer such as for instance foamed polystyrene is an important industrial commodity, particularly in the form of blocks that are cut up into boards and other shapes. Foamed polystyrene blocks are commonly produced by a process in which foamable particles consisting essentially of polystyrene and a volatile blowing agent are expanded by the action of heat so as to produce a "prefoam" of foamed beads, and these foamed beads are placed in a suitable mold and heated by steam in a molding operation where expansion and consolidation of the beads takes place and a block conforming to the shape of the mold is produced. This process works well in principle, but is capable of improvement in certain respect; in particular for instance it would be advantageous to shorten the time for which a block sometimes needs to be allowed to cool before it can be safely removed from the mold. However, it has now been found that an improvement can be effected in this respect if a specially treated foamable polymer is employed. Further advantages that often result are firstly that the foamed beads have a reduce disposition to stick together into the clusters that have sometimes tended to cause blockages in handling apparatus, and secondly that the individual beads are better consolidated in the final molded article.

The invention comprises particles of a foamable resin, comprising a vinylaromatic polymer, a volatile blowing agent, and a lipophilic surface-active agent.

The process of the invention is one for the production of a foamed article, for example a block, which comprises preparing a prefoam of foamed beads from foamable particles of the invention, and treating the foamed beads in a mold, for instance with steam, to produce the required article.

Particularly valuable results are obtained when the vinylaromatic polymer is polystyrene itself, but it can be for instance a toughened polystyrene; a polymer of a substituted styrene, such as α-methylstyrene; or a copolymer of syrene with a minor proportion (such as 10% or 20% by weight) of an ethylenically unsaturated monomer, for instance an acrylate (such as methyl methacrylate), acrylonitrile or butadiene.

The volatile blowing agent is preferably a hydrocarbon blowing agent or some other volatile substance that swells but does not dissolve the vinylaromatic polymer. A hydrocarbon blowing agent can be gaseous or a liquid under normal conditions of temperature and pressure and can for instance be a butane or a pentane. Preferably it is essentially a pentane fraction. Usually up to about 10% of a blowing agent by weight of the polymer is present, for instance from 3 to 10%.

The surface-active agent is a lipophilic one, which means that it has a much greater solubility in organic solvents, such as for example benzene, than in water. Normally the agent is substantially insoluble in water and has an "HLB number" (as defined by Griffin in The Journal of the Society of Cosmetic Chemists, 1949, I, 311–326 and 1954, 5, 249–256) that is less than 10, for example from 1.5 or 2 to 9. The agent is preferably nonionic, for example a long-chain ester or ether of a polyhydric alcohol such as for instance ethylene glycol, propylene glycol, sorbitan, sorbitol or a polycondensate of ethylene oxide. These preferred surface-active agents also contain a long chain of carbon atoms, which needs to be long enough to reduce any tendency toward hydrophilic properties but is preferably not so long as to render the agent insoluble in organic solvents. Generally the chain length is at least 12, and preferably from 12 to 18, carbon atoms long. Where the agent is an ester it is preferably a monoester, and is usually one of a long-chain fatty acid such as for example lauric, stearic, palmitic and oleic acids. Where the agent is an ether, it can for instance be one of an appropriate long-chain fatty alcohol, for example dodecyl alcohol, or of a long-chain alkylphenol, for example dodecyl phenol. Excellent results have been obtained using monoesters of sorbitol, particularly the palmitate, stearate and laurate of this alcohol.

The amount of the surface-active agent is often not more than about 0.5% by weight of the polymer, for instance from 0.02 to 0.3%, or 0.05 to 0.2% by weight. About 0.1 or 0.15% by weight has given good results.

The surface-active agent can be incorporated in any convenient way; for example particles of a foamable polymer can be tumbled with the appropriate quantity of the agent. Sometimes the agent is a viscous liquid, and here the tumbling operation is assisted if its viscosity is reduced by mixing it with a small amount of an appropriate organic liquid, such as for instance an alcohol such as for instance methanol, ethanol or isopropanol, or a hydrocarbon such as for instance pentane or hexane; for example where the blowing agent is a volatile liquid a little of it can be used for this purpose. Another possible method of incorporation is to arrange for the surface-active agent to be present during at least the later stages of a process of polymerization in which the foamable polymer is formed, so that the agent becomes incorporated in the particles of polymer.

The foaming and molding operations can follow ordinary practice; thus the foamable particles can for example be heated by steam, hot water or hot air, or under the influence of an infrared heater, to produce foamed beads, and these are preferably conditioned by exposing them to the atmosphere for a day or two before they are used in the molding operation. The foamed particles very often have an improved ability to flow under gravity and so are easily handled during this part of the process. A suitable mold is fully or partially filled with foamed beads and closed, and then steam is injected through inlets in the mold walls. When foaming is complete, the steam supply is shut off and the article is allowed to cool in the mold before the mold is opened. The article, such as a block, is cooled to such an extent that it does not "bulge" on opening the mold.

The cooling time of a molded article made from foamable particles according to the invention is significantly less than the cooling time necessary when foamable polymer particles are employed that are otherwise similar except that they do not contain a surface-active agent additive according to the invention. In any particular instance the cooling time of a molded article depends to a certain extent on its size, but in many cases it has been found that the cooling time is for example between 50% and 80% of the "normal" cooling time; from 60% to 70% of the normal cooling time is often adequate.

The invention is illustrated by the following examples.

EXAMPLE I

This example describes several foamable polystyrenes according to the invention and their use in the production of formed polystyrene articles, and demonstrates the improvements obtained.

Foamable polystyrene particles containing a pentane blowing agent were tumbled in a double conical blender with 0.1% (by weight of the polystyrene) of Span 40 (a commercial surface-active agent consisting essentially of sorbitan monopalmitate and having an HLB number 6.7).

A second lot of particles was treated in this way using 0.15% by weight of Span 40 and two further lots were similarly treated using respectively 0.1% and 0.15% by weight of Span 60 (sorbitan monostearate, HLB number 4.7) as the additive in place of Span 40. A fifth lot was treated with 0.1% by weight of Span 20 (sorbitan monolaurate, HLB number 8.6) mixed with its own weight of n-pentane in order to assist mixing.

Each lot of particles was foamed in a steam atmosphere in a continuous prefoaming apparatus and left to dry on an open tray for one day. Any tendency for the "prefoam" of foamed beads to stick together into clusters was noted, and the ability of the prefoam to flow down an inclined surface was also determined by passing it as it issued from the prefoamer down a chute whose angle from the vertical could be varied, the maximum angle at which the prefoam would flow being measured for each lot. A control sample of beads that had not been treated with a surface-active agent was similarly foamed and dried. An amount from each lot of foamed beads was placed in a suitable mold and molded into a 1 foot cube block by injection of steam through a number of holes in the walls of the mold to give a pressure of about 14 pounds per square inch for one minute. The block was left to cool, and removed from the mold as soon as the mold could be opened without causing the block to "bulge." A number of molding experiments were carried out in order to determine the minimum cooling time for each lot. The results for each case are set out below:

| Surface-active agent | Amount, percent | Cluster formation | Flow angle (maximum), degrees | Cooling time, minutes |
|---|---|---|---|---|
| None | | Large clusters | 43 | 45 |
| Span 40 | 0.1 | None | 48 | 34 |
| Span 40 | 0.15 | do | 51 | 35 |
| Span 60 | 0.1 | do | 48 | 40 |
| Span 60 | 0.15 | do | 50 | 29 |
| Span 20 | 0.1 | do | 47 | 27 |

All the molded blocks had good physical properties and it was also noted that the foamed beads were better consolidated in the blocks molded from the treated beads than in the "control" block.

These results demonstrated the considerable improvements that had been achieved with the foamable polystyrenes of the invention.

EXAMPLE II

This example describes another foamable polystyrene according to the invention and its use in the production of a foamed polystyrene article, and demonstrates the improvements obtained.

Foamable polystyrene particles (of a different grade from those used in Example I) containing a pentane blowing agent were continuously blended in a Lodige-Morton mixer with 0.1% (by weight of the polystyrene) of Span 85 (a commercial surface-active agent consisting essentially of sorbitan trioleate and having an HLB number 1.8), mixed with its own weight of isopropanol in order to assist mixing.

The particles were foamed and molded into a block as described in Example I, a control lot of untreated particles being similarly foamed and molded. Most of the treated foamed particles emerged individually from the prefoaming apparatus, only a few small clusters being observed, whereas the control foamed particles formed such large clusters that the outlet was blocked. It was therefore not possible to measure the "flow angle" for the control particles but the angle for the treated particles was 57°. The block molded from the treated particles had a cooling time of only 7 minutes whereas the control block had a cooling time of 23 minutes. Both blocks had good physical properties.

These results demonstrate the improvements that had been achieved with the foamable polystyrene of the invention.

What is claimed is:

1. In a process for preparing a foamed resin by (1) heating foamable particles comprising a vinylaromatic polymer and a volatile blowing agent to form a prefoam of foamed particles, (2) treating the prefoam with steam in a mold to form a shaped article, and (3) allowing the shaped article to cool before removing it from the mold, the improvement which comprises coating the foamable resin particles with 0.02–0.3% by weight of a sorbitan fatty acid ester containing 12–18 carbon atoms in the fatty acid moiety and having an HLB number of 1.5–9:

2. The process of claim 1 wherein the foamable particles are coated with 0.1–0.15% by weight of the sorbitan fatty acid ester.

3. The process of claim 1 wherein the sorbitan fatty acid ester is sorbitan monolaurate.

4. The process of claim 1 wherein the sorbitan fatty acid ester is sorbitan monopalmitate.

5. The process of claim 1 wherein the sorbitan fatty acid ester is sorbitan monostearate.

6. The process of claim 1 wherein the sorbitan fatty acid ester is sorbitan trioleate.

7. The process of claim 1 wherein the vinyl-aromatic polymer is polystyrene.

8. The process of claim 1 wherein the blowing agent comprises a volatile hydrocarbon.

9. The process of claim 8 wherein the volatile hydrocarbon is pentane.

10. The process of claim 1 wherein the foamable particles comprise 3–10% by weight of the blowing agent.

References Cited

UNITED STATES PATENTS

| 2,857,341 | 10/1958 | Colwell et al. |
| 2,911,381 | 11/1959 | Roth. |
| 2,989,782 | 6/1961 | Barkhuff et al. |
| 3,015,132 | 1/1962 | Bunting _____ 264—51 |

MURRAY TILLMAN, Primary Examiner

MORTON FOELAK, Assistant Examiner

U.S. Cl. X.R.

264—53; 338

PO-1050
(5/69)

UNITED STATES PATENT OFFICE
CERTIFICATE OF CORRECTION

Patent No. 3,480,570      Dated November 25, 1969

Inventor(s) Brinley Roberts and Robert James Stephenson

It is certified that error appears in the above-identified patent and that said Letters Patent are hereby corrected as shown below:

Column 1, line 47, "respect" should read --respects --; line 54, "reduce" should read -- reduced --. Column 3, line 65, the numeral "47" should read -- 57 --. Column 4, line 5, "improvemenfs" should read -- improvements --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents